R. NEISCH & C. G. HIRNER.
Improvement in Car-Couplings.
No. 132,852.　　　　　　　　　　　Patented Nov. 5, 1872.
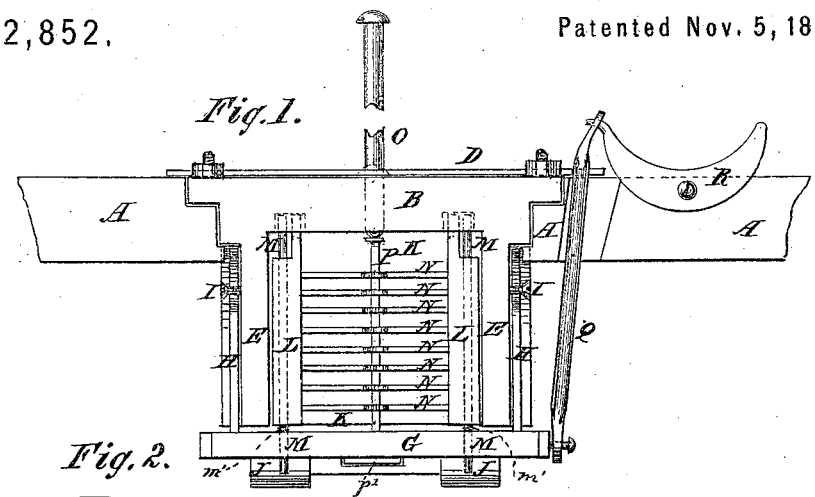
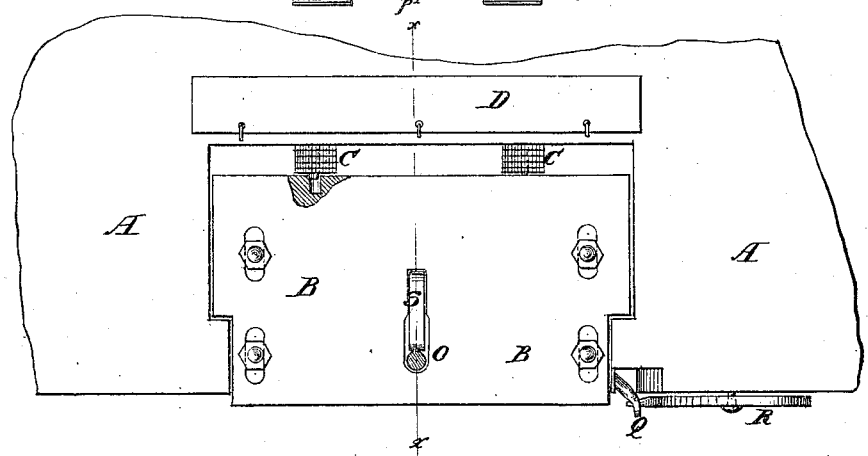
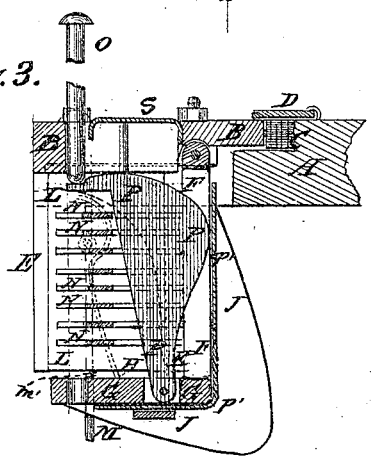
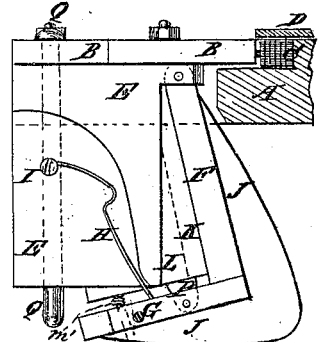

UNITED STATES PATENT OFFICE.

ROBERT NEISCH AND CHARLES G. HIRNER, OF ALLENTOWN, PA.

IMPROVEMENT IN CAR-COUPLINGS.

Specification forming part of Letters Patent No. 132,852, dated November 5, 1872.

*To all whom it may concern:*

Be it known that we, ROBERT NEISCH and CHARLES G. HIRNER, of Allentown, in the county of Lehigh and State of Pennsylvania, have invented a new and useful Improvement in Car-Coupling, of which the following is a specification:

Figure 1 is a front view of our improved car-coupling; Fig. 2 is a top view of the same; Fig. 3 is a detail sectional view of the same taken through the line $x\ x$, Fig. 2; and Fig. 4 is a side view of the same.

Similar letters of reference indicate corresponding parts.

Our invention has for its object to furnish an improved car-coupling which shall be simple in construction, convenient in use, and effective in operation, being so constructed as to couple automatically as the cars are run together, even though the cars to be coupled should differ in height, and which may readily be so adjusted that the cars will uncouple as they are drawn apart; and it consists in the construction and combination of various parts of the coupling, as hereinafter more fully described.

A represents the part of the frame-work of the car to which the coupling is attached. B is a block or heavy plate which is inserted in a seat in the part A, to which it is secured by bolts which pass through slots in the said block B. C are rubber springs inserted between the inner edge of the block B and the edge or shoulder of the part A, as shown in Figs. 2, 3, and 4. The springs C are kept in place by guide-pins, and may be covered and protected by a hinged plate, D, as shown in the drawing. The springs C are designed to diminish the shock when the cars are run together. Upon the under side of the block B, near its ends, are formed, or to it are attached, two downwardly-projecting parallel plates, E. F is a plate placed at the rear edges of the plate E, and which is pivoted at its upper edge to the rearwardly-projecting upper parts of the said plates E or to the block B. To the forward side of the lower end of the plate F is securely attached, or upon it is formed, a plate, G, projecting forward at right angles with the plate F, so as, when the said plate F is swung forward against the rear edges of the plates E, to rest against the lower edges of the said plates E. The movements of the plates F G are limited by the spring-catch bars H, the lower ends of which are attached to the end parts of the plate G. The bars H extend up along the outer sides of the plates E, and their upper ends are curved so as to catch upon pins I attached to the said plates E to limit the movements of the said plates F G. The plates F G are strengthened by knee-braces J fitted to them, as shown in Figs. 3 and 4. K is a plate, to the side edges of which are attached the rear edges of two side plates, L, and which are made of such a size as to fit into the space between the blocks B and M and plates E E, as shown in the drawing. The upper ends of the plates K L are tenoned or otherwise formed to enter mortises or recesses in the under side of the block B, and are raised and lowered by the movements of the plates F G. M are rods which pass up through the plate G through the plates L and enter holes in the block B, and which are designed to serve as guides. Around the rods M, between the plate G and the lower edges of the plates L, are placed coiled springs $m$, to give the plates K L the necessary play. N are plates, the inner and side edges of which are let into the faces of the plates K L, so as to be firmly connected with said plates K L and which are placed at such a distance apart as to readily receive the end of the coupling-link between them. The forward edges of the plates N are notched for the passage of the coupling-pin O, which passes down through a hole in the block B and in the plate G, as shown in Fig. 3. The plates F and K and the rear parts of the plates N are slotted to receive the lever P, which is pivoted at its lower end to the plate G, and upon the forward side of its upper end is formed a projection to receive the end of the coupling-pin when the cars are uncoupled, as shown in Figs. 1 and 3. The lever P is held forward by the spring $p'$ attached to the under side of the plate G, and which projects upward along the rear side of the plate F so as to rest against the projecting rear edge of the lever P, as shown in Fig. 3. As the cars are run together the end of the coupling-link enters one or the other of the spaces between the plates N, according to the height of the adjacent car, and pushes back the lever P, which allows the coupling-pin O to drop into place. To the forward part of one end of the plate G is pivoted the lower end of the connecting-rod Q, the upper end of which is pivoted to one end of the lever R, which is pivoted at or near its center to the frame A, so that by pressing down one end of the lever R the movable parts of the coupling may be raised into place, and by pressing upon the other end the said parts may be lowered, releasing the lower end of the coupling-pin O, so that the coupling-link may be drawn from said pin as the cars are drawn apart, the hole in the block B through which the pin O passes being elongated into a slot to allow the lower end of the said coupling-pin to be drawn outward. The pin O is held in place in the forward end of said slot by a spring, S, placed in its inner end, and which is so formed as to be compressed and allow the pin O to take an inclined position when its lower end is released and drawn outward. The lever R may be placed beneath the frame A, if desired, in which case it should have rods pivoted to its ends and passing up through the said frame, so that the lever may be conveniently operated by the brakeman with his foot.

Having thus described our invention, we claim as new and desire to secure by Letters Patent—

1. The combination of the block B, rigid plates E, pivoted plates F G, knee-braces J, spring-catches H, plates K L, rods M, springs $m$, and parallel plates N notched upon the forward and rear sides with each other, substantially as herein shown and described, and for the purposes set forth.

2. The combination of the lever P and spring $p'$ with the coupling B E F G J K L M N to adapt the said lever to receive and support the coupling-pin, as and for the purpose set forth.

3. The combination of the spring S with the coupling-pin O, substantially as herein shown and described, and for the purposes set forth.

4. The combination of the connecting-rod Q and pivoted lever R with the coupling B E F G J K L M N, substantially as herein shown and described, and for the purpose set forth.

ROBERT NEISCH.
CHARLES GOTTLIEB HIRNER.

Witnesses:
GEORGE W. BEYERL,
M. F. HIRNER.